United States Patent
Aubouy (10) Patent No.: US 8,721,955 B2
(45) Date of Patent: May 13, 2014

(54) DEVICE AND METHOD FOR ETCHING A PATTERN

(75) Inventor: Miguel Aubouy, Grenoble (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 53 days.

(21) Appl. No.: 13/464,260

(22) Filed: May 4, 2012

(65) Prior Publication Data

US 2012/0280431 A1 Nov. 8, 2012

(30) Foreign Application Priority Data

May 4, 2011 (FR) ...................................... 11 53831

(51) Int. Cl.
*B41C 1/05* (2006.01)
*B29C 59/16* (2006.01)

(52) U.S. Cl.
USPC ........ 264/400; 264/293; 425/174.4; 425/385; 219/121.68

(58) Field of Classification Search
CPC .. B23K 26/365; B23K 26/04; B23K 26/0661; B44C 1/228
USPC ............... 264/400, 293, 294, 154; 425/174.4, 425/385, 138; 219/121.68
See application file for complete search history.

(56) References Cited

U.S. PATENT DOCUMENTS

| | | | |
|---|---|---|---|
| 4,564,736 A | 1/1986 | Jones et al. | |
| 5,436,027 A | 7/1995 | Offer | |
| 5,656,229 A * | 8/1997 | Tanimoto et al. | 264/400 |
| 6,685,868 B2 * | 2/2004 | Costin | 264/400 |
| 6,936,195 B2 * | 8/2005 | Fan et al. | 264/1.33 |
| 7,572,122 B2 * | 8/2009 | Bauer et al. | 425/174.4 |
| 7,919,036 B2 * | 4/2011 | Bauer et al. | 264/400 |
| 8,541,714 B2 * | 9/2013 | Gu | 219/121.68 |
| 8,581,141 B2 * | 11/2013 | Muratsubaki et al. | 219/121.67 |
| 8,624,154 B2 * | 1/2014 | McElroy et al. | 219/121.68 |
| 2003/0192182 A1 * | 10/2003 | Hiramatsu et al. | 29/852 |
| 2003/0192865 A1 * | 10/2003 | Cole et al. | 219/121.67 |
| 2009/0212029 A1 | 8/2009 | Ellis et al. | |
| 2011/0187025 A1 * | 8/2011 | Costin, Sr. | 264/400 |
| 2012/0091630 A1 * | 4/2012 | Teague et al. | 264/400 |
| 2013/0029092 A1 * | 1/2013 | Wakioka | 428/131 |

FOREIGN PATENT DOCUMENTS

| | | |
|---|---|---|
| DE | 3906336 | 8/1990 |
| DE | 4429751 | 3/1995 |
| DE | 19839482 | 3/2000 |
| DE | 102004054940 | 5/2006 |
| EP | 1502544 | 2/2005 |
| EP | 2289708 | 12/2011 |
| FR | 0953432 | 12/1949 |
| FR | 2831258 | 4/2003 |

\* cited by examiner

*Primary Examiner* — Joseph S. Del Sole
*Assistant Examiner* — Nahida Sultana
(74) *Attorney, Agent, or Firm* — Occhiuti & Rohlicek LLP (57) ABSTRACT

An apparatus for etching a pattern in an etching zone laid out on a substrate includes a pen that can be freely moved manually relative to the etching zone, the pen being equipped with an etching head able to etch the substrate at an etching point when etching is triggered, a measuring unit for measuring position and orientation of the etching head relative to the substrate, a control unit configured to calculate coordinates of the etching point as a function of the measured position and orientation of the etching head relative to the substrate, to trigger etching at the etching point if the calculated coordinates of the etching point correspond to coordinates of a point to be etched, the coordinates of the point to be etched being encoded in a prerecorded drawing of the pattern, and to automatically prevent etching otherwise.

16 Claims, 4 Drawing Sheets

DEVICE AND METHOD FOR ETCHING A PATTERN

RELATED APPLICATIONS

Under 35 USC 119, this application claims the benefit of the priority date of French Patent Application 1153831, filed May 4, 2011, the contents of which are herein incorporated by reference.

FIELD OF DISCLOSURE

The invention relates to a device and a method for etching a pattern in an etching zone laid out on a substrate material. The invention also relates to a data storage medium, to a pen and to a terminal for implementing this etching method.

BACKGROUND

The term "etching" is understood to mean the action of excavating a hole in the substrate. This hole may or may not be a through-hole. Producing a series of through-holes next to one another may make it possible to cut through the substrate. Producing blind holes allows the pattern to be etched in relief in the substrate.

The invention relates in particular to "contactless" etching devices, i.e. devices in which the etching head does not make direct mechanical contact with the etched substrate.

SUMMARY

Etching devices comprise at least one pen that can be freely moved manually relative to the etching zone, this pen being equipped with an etching head able to etch the substrate at an etching point when the etching is triggered.

For example, such a device is disclosed in patent application U.S. Pat. No. 4,564,736. In this known device, the etching head can be freely moved by the operator. Thus, this device imposes only very few constraints on the etched substrate. For example, the substrate may be of any size and be inclined at any angle. Consequently, this device can be used to etch patterns on substrates as diverse as a wall, ceiling or floor of a building, a plate, etc.

However, with the known devices the fidelity of reproduction of the pattern in the substrate largely depends on the dexterity of the operator. This is because it is the operator alone who directs the pen and triggers the etching.

Moreover, to prevent shards from being sprayed, the operator tends to distance the pen from the substrate. However, the further the pen is from the substrate, the harder it is to etch it precisely. There is therefore a compromise between safety, which requires as large as possible a distance between the pen and the substrate, and precision, which requires the pen to be as close as possible to the substrate.

U.S. Pat. No. 4,564,736 A, DE 102 004 054 940 A1, DE 3 906 336 A1, U.S. Pat. No. 5,436,027 A, FR 2 831 258 A1 and DE 4 429 751 A1 are known prior-art documents.

The invention aims to solve at least one of these drawbacks. Therefore, one subject of the invention is an etching device in which the device comprises:
a unit for measuring the position and the orientation of the etching head relative to the substrate; and
a control unit able to:
calculate the coordinates of the etching point as a function of the measured position and orientation of the etching head; and
trigger the etching at this etching point if the coordinates calculated for this etching point correspond to the coordinates of a point to be etched which is encoded in a prerecorded drawing of the pattern and, if this is not the case, automatically prevent the etching.

In the above device, only the etching points corresponding to the coordinates of a point to etch may be etched. Consequently, the fidelity of reproduction of the pattern to be etched on the substrate no longer depends on the dexterity of the operator.

In addition, the etching of an incorrect point is prevented independently of the distance separating the pen from the substrate. Thus, the operator may hold the pen at a safe distance from the substrate without affecting the precision with which the pattern is etched.

Finally, the fact that the pen remains able to be freely moved manually relative to the substrate still allows a wide variety of substrates to be etched.

The embodiments of the above etching device may comprise one or more of the following features:
the device comprises at least one removable reference terminal that can be manually positioned on the substrate and is associated with a corresponding point of the pattern to be etched by a predefined relationship that is independent of the position of this reference terminal on the substrate; the measuring unit is able to measure the position and orientation of the etching head relative to the reference terminal; and the control unit is able to establish the correspondence and, alternatively, the lack of correspondence between the calculated coordinates of the etching point and the coordinates of the point to be etched as a function of the predefined relationship that associates a point of the pattern with this terminal;
the device comprises:
at least two reference terminals; and
the measuring unit is able to measure the distance between these two terminals; and
the control unit is able to establish the correspondence and, alternatively, the lack of correspondence between the calculated coordinates of the etching point and the coordinates of the point to be etched as a function also of the distance measured between these two reference terminals so as to stretch or shrink the pattern in proportion to this distance;
the device comprises at least one relay terminal that can be manually positioned independently of the reference terminal, this relay terminal not being associated with a point of the pattern by a predefined relationship that is independent of its position relative to the substrate; and the measuring unit also comprises:
a sensor for sensing the position and orientation of the etching head in the reference frame of this relay terminal;
a sensor for sensing the position and orientation of the relay terminal relative to the reference terminal; and
a converter for converting the position and orientation of the etching head that are measured in the reference frame of the relay terminal into a position and an orientation relative to the reference terminal;
the etching head is able to emit a laser beam that etches the etching point;
the device comprises a table equipped with a window protecting against shards flying from the etching, and feet intended to rest on the substrate; and the one or more reference terminals are fixed, with no degree of freedom, to this table; and
the etching head is able to spray particles made of an abrasive material that etches the etching point.

These embodiments of the device furthermore have the following advantages:

- using a reference terminal associated with a point to be etched of the prerecorded drawing allows the pattern to be simply positioned on the substrate;
- using at least two reference terminals and measuring the distance between these two reference terminals allows the pattern etched to be stretched or shrunk in proportion to this measured distance;
- using a relay terminal allows the size of the etching zone to be increased without increasing the power of the signals used to measure the position of the pen; and
- using the above table allows the reference terminals and the protective window to be positioned in a single operation.

Another subject of the invention is a method for etching a pattern in an etching zone, which zone is laid out on a substrate material, this method comprising:

- manually moving a pen freely over the etching zone, this pen being equipped with an etching head able to etch the substrate at an etching point when the etching is triggered;
- measuring the position and orientation of the etching head relative to the substrate;
- calculating the coordinates of the etching point as a function of the measured position and orientation of the etching head; and
- triggering the etching at this etching point if the coordinates calculated for this etching point correspond to the coordinates of a point to be etched which is encoded in a prerecorded drawing of the pattern and, if this is not the case, automatically preventing the etching.

Embodiments of this etching method may comprise one or more of the following features:

the method comprises:
a) storing in memory each point of the pattern already etched in response to the etching being triggered;
b) preventing the etching of any point that has already been etched; and,
c) after it has been triggered, the etching of a point is automatically stopped after a preset period of time;
steps a) to c) are reiterated for each stratum of the prerecorded drawing, this prerecorded drawing comprising at least two strata each encoded with the coordinates of the points to be etched in a respective stratum of the substrate.

the method comprises:
counting the cumulative time spent etching a give etching point; and
preventing any additional etching of this etching point if the counted etching time is above a predefined threshold and, if this is not the case, permitting additional etching of this point; and
the method comprises determining the distance that separates the pen from the substrate using the measured position and orientation of the etching head and preventing the etching of the pattern in the substrate or triggering an alarm if this distance is below a predefined threshold.

These embodiments of the method furthermore have the following advantages:

- automatically stopping the etching after a predefined period of time allows the depth of the etch to be controlled;
- automatically stopping the etching of a point of each stratum of the prerecorded drawing allows a sculpture to be produced in relief;
- automatically stopping the etching of a point as a function of the cumulative etch time also allows the etch depth of this point to be controlled; and
- measuring the distance h increases the safety of the method by helping the operator to keep the etching head a safe distance from the substrate.

Another subject of the invention is a data storage medium comprising instructions for implementing the above etching method, these instructions being executed by an electronic processing unit.

Another subject of the invention is a pen employed in the above etching device, this pen being equipped with an etching head that can be moved manually over the etching zone, and with at least some of the elements of the measuring unit able to measure the position of the etching head relative to the substrate.

BRIEF DESCRIPTION OF THE DRAWINGS

The invention will be better understood on reading the following description that is given merely by way of non-limiting example and with reference to the drawings in which.

In these figures, the same references are used to denote the same elements.

DETAILED DESCRIPTION

In the rest of this description, features and functions that are well known to those skilled in the art are not described in detail.

Figure 1:
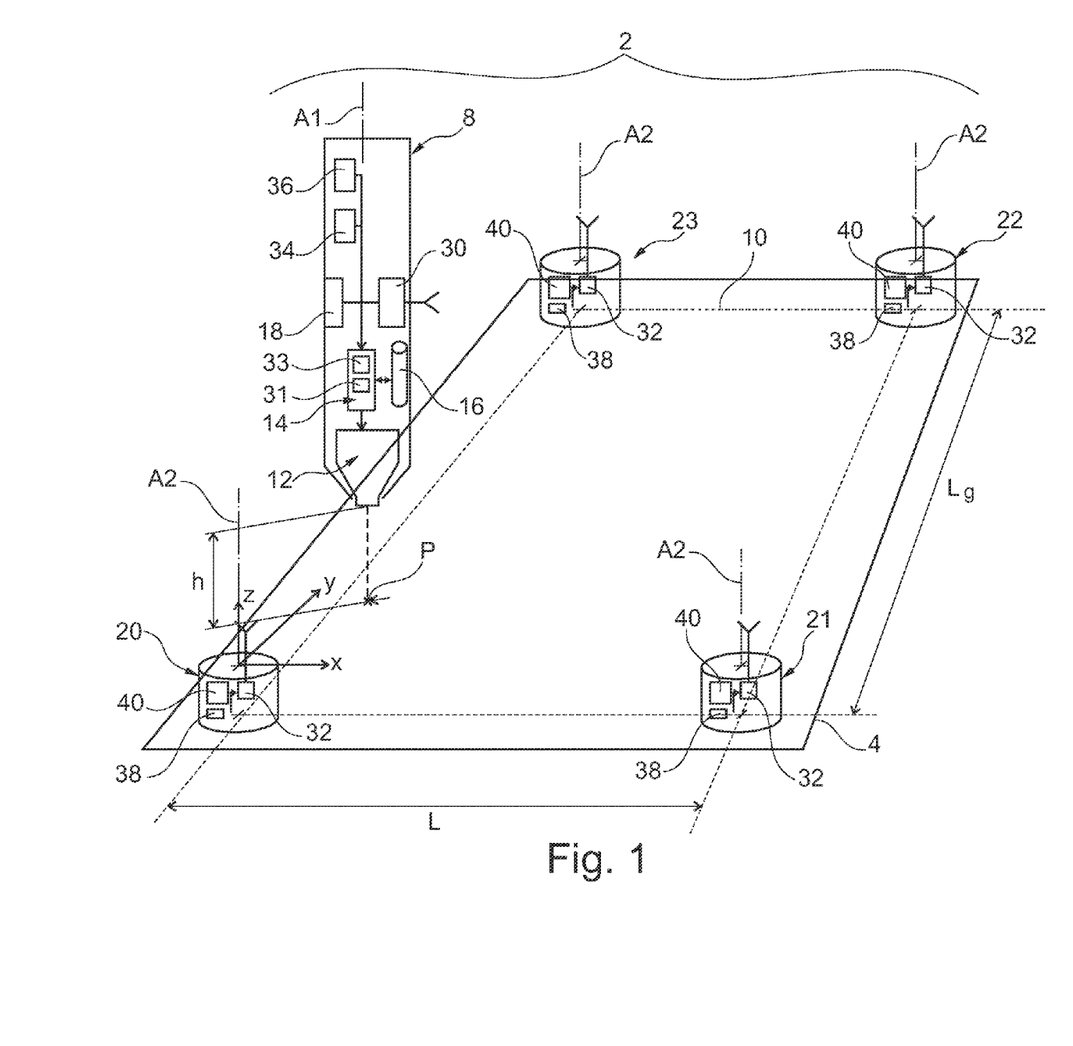
FIG. 1 is a schematic perspective illustration of a first embodiment of an etching device.

FIG. 1 shows a device 2 for etching a pattern in a horizontal physical substrate 4. Here the term "pattern" is understood to mean any type of pattern that could be etched on the substrate 4. This pattern could be a photo, a text, a geometric pattern, or a stencil design, etc.

The substrate 4 has an upper face that is flat and horizontal. The substrate 4 is made of a material that can be etched. For example, the material is metal, plastic, glass, wood, paper, leather, etc.

In this embodiment, the device 2 is portable, i.e. it can be carried directly by a person without technical lifting means being required. Specifically, the weight of all the elements of the device 2 is typically less than 10 kg and preferably less than 5 or 1 kg. To make transporting it easier, the volume of all of the elements of this device 2 is typically less than $0.15$ m$^3$ and, preferably, less than $10^{-3}$ or $10^{-4}$ m$^3$.

The device 2 comprises a pen 8 that can be moved manually by an operator over an etching zone 10 laid out on the upper face of the substrate 4 and inside of which the pattern must be etched. The pen 8 is vertically separated from the substrate 4 by a height h greater than a non-zero threshold $S_1$ so that the pen does not make direct contact with the substrate.

The etching zone 10 is here rectangular with a width L and a length Lg.

The pen 8 lies essentially along a longitudinal axis A1. The dimensions of the pen 8 are chosen so that the latter can be easily manipulated by the operator's hand. For example, the length of the pen 8 is less than 20 cm and its width is less than 5 cm. The weight of the pen 8 is typically less than 1 kg and, preferably, less than 200 g.

The pen 8 comprises an etching head 12 that contains all the elements required to etch the substrate 4. For example, in this embodiment, the head 12 incorporates a source of laser radiation. For example, the source is a laser diode emitting at a wavelength of 808 nm and power of 2 W. This head 12 therefore emits a laser beam able to etch the substrate 4 at an etching point P. The point P is located at the intersection between a line of sight and the substrate 4. Here, the line of sight coincides with the axis A1.

The pen 8 also comprises:
- a unit 14 for controlling the etching head 12;
- a memory 16 that contains a drawing of the pattern to be etched on the substrate 4;
- an interface 18; and
- an energy source (not shown), required to make the pen work, such as a battery.

The unit 14 is connected to the memory 16. The drawing stored in the memory 16 encodes the coordinates of each point to be etched in order to form the pattern. More precisely, in this embodiment, the drawing is divided into a number of strata stacked in a predefined order. Each stratum corresponds to a cross section of the pattern to be etched and to an etch depth. The strata stacked in a direction perpendicular to the substrate define a three-dimensional pattern to be etched. By way of illustration, each stratum is stored in bitmap (bmp) format. Thus, each stratum is formed from a matrix of points and, for each point, the file indicates, in addition to its coordinates, whether or not this point is to be etched. By analogy to a point of a bitmap file encoding an image, the points of this file are called pixels in the following. Here, the drawing is a rectangle.

The control unit 14 is formed using programmable electronic processing units that are able to execute instructions stored on a data storage medium. Specifically, the memory 16 contains the instructions required to execute the method in FIG. 2, these instructions being executed by the unit 14.

The interface 18 allows the pen 8 to be connected to a computer so as to record the drawing of the pattern to be etched in the memory 16.

The device 2 also comprises removable reference terminals that can be manually positioned on the substrate 4. By way of illustration, in this embodiment, the device comprises four reference terminals 20 to 23.

The terminals 20 to 23 are added to the already existing substrate 4. They are therefore mechanically independent of the substrate 4. They may be freely positioned on the substrate 4 by the operator. Here, the terminals are placed on the substrate 4 and only held in place on the substrate 4 by gravity.

Each of these reference terminals is associated with a point of the pattern to be etched by a predefined relationship that is independent of the position of the terminal on the substrate. This predefined relationship is for example stored in the memory 16. Here this predefined relationship indicates that each of the terminals 20 to 23 corresponds to a corner of the rectangular drawing. These terminals therefore bound the etching zone 10.

The device 2 comprises a unit for measuring the position and the orientation of the etching head 12 relative to the reference terminals 20 to 23. This unit measures the six degrees of freedom of the etching head. Specifically, the position and the orientation of the etching head are given, respectively, by two sets of three coordinates x, y, z and $\theta_x$, $\theta_y$, $\theta_z$ expressed in an orthogonal reference frame XYZ fixed, with no degree of freedom, to the terminal 20. Here, the directions X and Y of the reference frame XYZ are parallel to the upper face of the substrate 4 whereas the direction Z extends vertically. The angles $\theta_x$, $\theta_y$, $\theta_z$ correspond to the angles that the axis A1 makes with the X, Y and Z directions, respectively.

To determine the position of the etching head 12, in this embodiment, the pen 8 and the terminals 20 to 23 are equipped, respectively, with electromagnetic wave transmitter/receivers 30 and 32. For example, the transmitter/receivers 30 and 32 are ultra-wide band (UWB) transmitter/receivers. Each of these transmitter/receivers is equipped with a clock that allows the instants of transmission and reception of the waves to be measured so as to allow the propagation time of the wave between the transmitter/receivers 30 and 32 to be measured.

The unit 14 is also equipped with a processor 33 and a clock 31. The processor 33 determines the distance separating the pen 8 from each of the terminals 20 to 23 based on the measured propagation time.

The orientation of the etching head is represented here by the orientation of the axis A1 aligned with the etching head. The orientation of the etching head 12 is therefore measured by measuring the angles $\theta_x$, $\theta_y$, and $\theta_z$. For this purpose, the measuring unit also comprises:
- an accelerometer 34 and a magnetometer 36 that are fixed, with no degree of freedom, to the pen 8; and
- accelerometers 38 and magnetometers 40 that are fixed with no degree of freedom to each of the terminals 20 to 23.

For example, the accelerometer 34 and the magnetometer 36 are housed inside the pen 8. Art accelerometer 38 and a magnetometer 40 are housed inside each of the terminals 20 to 23.

The accelerometer 34 measures the angle that the axis A1 makes with the vertical direction represented by the local direction of Earth's gravitational field. The magnetometer 36 measures the angle that the axis A1 makes with the north pole of Earth's magnetic field.

Preferably, the accelerometer 34 and the magnetometer 36 are placed in that part of the pen 8 which is furthest from the etching head 12 so as to increase the precision of the measurement of the orientation of the axis A1.

The accelerometer 38 measures the angle that an axis A2, aligned with the reference terminal, makes to the vertical. The magnetometer 40 measures the angle that this axis A2 makes with magnetic north. For this purpose, the magnetometer 40 and the magnetometer 36 are triaxial magnetometers.

The orientation of the axis A2 must represent the orientation of the upper face of the substrate 4. To do this, here, each reference terminal is designed so that when it is placed on the substrate 4, the axis A2 is necessarily perpendicular to the upper face of the substrate 4. For example, each of the reference terminals comprises at least one planar face perpendicular to the axis A2 and intended to bear directly against the upper face of the substrate 4. Preferably, each reference terminal comprises at most two of these planar faces, the other faces of the terminal being concave. Here, each terminal is cylinder-shaped, the axis A2 being the axis of revolution of the cylinder.

The operation of the device 2 will now be described in greater detail with regard to the method in FIG. 2.

Initially, in a step 50, the drawing of the pattern to be etched is stored in the memory 16. For example, for this purpose, the pen 8 is connected to a computer via the interface 18.

Next, in a step 52, the terminals 20 to 23 are manually placed on the substrate 4. Here, they are positioned so as to define the corners of the etching zone 10.

In a step 54, a voltage is applied to the pen 8 and then the pen is moved closer to the etching zone 10. A working copy of the stored drawing is then automatically created in the memory 16, if this working copy does not already exist.

This being the case, in a step 56, the position of the etching head 12 is measured relative to the terminals 20 to 23. For this purpose, the processor 33 measures the time taken for the electromagnetic wave transmitted by the transmitter/receiver 20 to propagate as far as the terminals 20 to 23. These propagation times are then used by the unit 14 to establish the distance that separates the etching head 12 from each of the terminals 20 to 23. Similarly, in a step 56, the distances that separate the terminals 20 to 23 from one another are measured. Using these different propagation times, the unit 14 establishes the coordinates x, y and z of the etching head 12 in the reference frame XYZ by triangulation.

In parallel, in a step 58, the orientation of the axis A1 to the X, Y and Z directions is also measured. For this purpose, the accelerometer 34 and the magnetometer 36 measure the orientation of the axis A1 to vertical and magnetic north, respectively. At the same time, the accelerometers 38 and the magnetometers 40 of each of the terminals 20 to 23 measure the orientation of the axis A2 to the vertical and to magnetic north, respectively. These measurements are then transmitted to the unit 14 that combines them so as to obtain the angular coordinates $\theta_x$, $\theta_y$, and $\theta_z$, of the axis A1 in the reference frame XYZ.

Using the measured position and orientation of the pen 8, in a step 60, the unit 14 determines the vertical distance h (FIG. 1) that separates the etching head 12 from the substrate 4 and the angle $\theta_z$ between the axis A1 and the vertical direction Z. In a step 62, the unit 14 verifies whether the pen is located inside a cone in which etching is permitted, the cone lying substantially perpendicular to the plane of the substrate 4. For example, for this purpose, the distance h and the absolute value of the angle $\theta_z$ are compared, respectively, to predefined thresholds $S_1$ and $S_2$. If the distance h is below the threshold $S_1$ or if the absolute value of the angle $\theta_z$ is above the threshold $S_2$ then, in a step 64, the etching of the substrate $\theta_z$ is automatically prevented. Thus, the thresholds $S_1$ and $S_2$ define the cone in which etching is permitted. When the pen is not inside this cone, i.e. it is too near the substrate 4 or at too great an inclination to this substrate, then etching is prohibited because it cannot be carried out correctly or under optimal safety conditions. For example, the threshold $S_1$ corresponds to a safety distance that must be respected to prevent the operator from being injured by flying shards.

If this is not the case, the method continues with a step 66 in which the coordinates of the etching point P (FIG. 1) on the substrate 4 are calculated. The coordinates of the point P are obtained from the measured coordinates x, y, z and $\theta_x$, $\theta_y$, $\theta_z$, of the etching head. For example, the coordinates of the point P are obtained by calculating the coordinates of the point of intersection between the axis A1 and the etching zone 10.

Next, in a step 68, the unit 14 determines whether the coordinates of the point P correspond to the coordinates of a point to be etched encoded in the working copy of the drawing previously stored in the memory 16. To do this, the predefined relationship relating each reference terminal to a point of the pattern is used.

For example, if it has not already been done, in an operation 70, the unit 14 calculates the size of the etching zone 10 from the position of the various terminals 20 to 23 relative to the pen 8 and the measured distances between the terminals 20 to 23. Next, in this operation 70, the unit 14 calculates a stretch factor allowing the coordinates of the point P expressed in the reference frame XYZ to be converted into coordinates corresponding to a pixel of the drawing of the pattern to be etched. For example, two stretch factors $C_x$ and $C_y$ in the X and Y direction, respectively, are calculated using the following equations:

$$C_x=(L_{img}/L)$$

$$C_y=(L_{gimg}/Lg)$$

where $L_{img}$ and $L_{gimg}$ are respectively the width and the length of the drawing of the pattern to be etched.

The space between the terminals therefore defines the dimensions of the pattern that will be etched. In other words, the more the reference terminals are spaced apart from one another, the larger the pattern to be etched becomes. Conversely, the closer the reference terminals are brought to one another, the more the pattern to be etched is shrunk. Here, in any case, the pattern to be etched occupies all of the etching zone. In this particular case, since the etching zone and the pattern to be etched are rectangles, the stretch factors $C_x$ and $C_y$ are constant whatever the x, y coordinates of the point P.

However, if the etching zone and the pattern to be etched do not have the same shape (for example the bounded etching zone is trapezoidal and the pattern to be etched is rectangular) then the stretch factors $C_x$ and $C_y$ vary as a function of the coordinates x, y of the point P so that the pattern again completely fills the etching zone.

Once the stretch factors $C_x$, $C_y$ have been established, in an operation 72, these are used to find the coordinates of the pixel of the drawing corresponding to the coordinates x and y of the point P. For example, the coordinates x and y are simply multiplied by the stretching factors $C_x$ and $C_y$, respectively, so as to obtain the coordinates $x_p$ and $y_p$ of the corresponding pixel. Once the corresponding pixel has been found, the file containing the working copy of the drawing indicates whether or not this pixel is a pixel to be etched. To do this, the unit 14 searches through the data items associated with the pixel of coordinates $x_p$ and $y_p$ in each of the strata of the drawing. If one of these data items indicates that this pixel is to be etched, then the latter corresponds to a pixel to be etched.

If the corresponding pixel found is a pixel to be etched, in a step 74, the unit 14 sends a signal to the etching head automatically triggering the etching of this pixel. After the etching has been triggered, it is automatically stopped after a predefined period of time Δ. Thus a laser pulse of pulse length Δ is generated. The period of time Δ is short, i.e. typically below 0.1 s or 10 μs. Here, after the etching has been triggered, the period of time Δ is counted by the clock 31. The fact that a laser pulse of known pulse length is generated allows the depth of the hole excavated in each pass of the pen over this point P to be controlled. In this step, preferably, the intensity of the laser beam projected onto the substrate is varied as a function of the measured orientation of the pen 12. For example, the intensity is varied by adjusting the power of the laser beam.

If the corresponding pixel is not a pixel to be etched, the etching of the point P is automatically prevented. To do this, step 74 is not executed and the procedure passes directly to step 80.

After step 74, in a step 77, the coordinates of the etched pixel are stored in memory. In the particular case described here, the unit 14 modifies the stratum of the working copy of the drawing, in which copy the pixel of coordinates $x_p$ and $y_p$ was associated with a data item indicating that it was to be etched. More precisely, this modification consists in replacing this data item with another data item indicating that this pixel of this stratum is not to be etched. Thus, if the pen is once more moved over the same point P, this point P will be etched again only if there is still, in the working copy of the drawing, a stratum in which the pixel of coordinates $x_p$ and $y_p$ is associated with a data item indicating that it is to be etched. If this is not the case, this pixel will not be etched again. This therefore allows the etch depth at each point P to be controlled.

In step 77, the unit 14 also verifies whether all the pixels to be etched of the drawing have already been etched. For example, this verification is obtained by scanning the pixels of the working copy of the drawing so as to determine whether there are still pixels to be etched.

If all the pixels have already been etched, the procedure then passes to step 78 in which the etching method is automatically stopped. The pen is then turned off and then the reference terminals 20 to 23 are removed from the substrate 4. The etching of the pattern into the substrate 4 is finished.

If this is not the case, in step 80, the operator manually moves the pen 8 to areas of the etching zone 10 that have not yet been etched. After this step 80, steps 56 to 80 are reiterated as long as all the pixels of the pattern to be etched have not been etched into the substrate 4.

Figure 3:
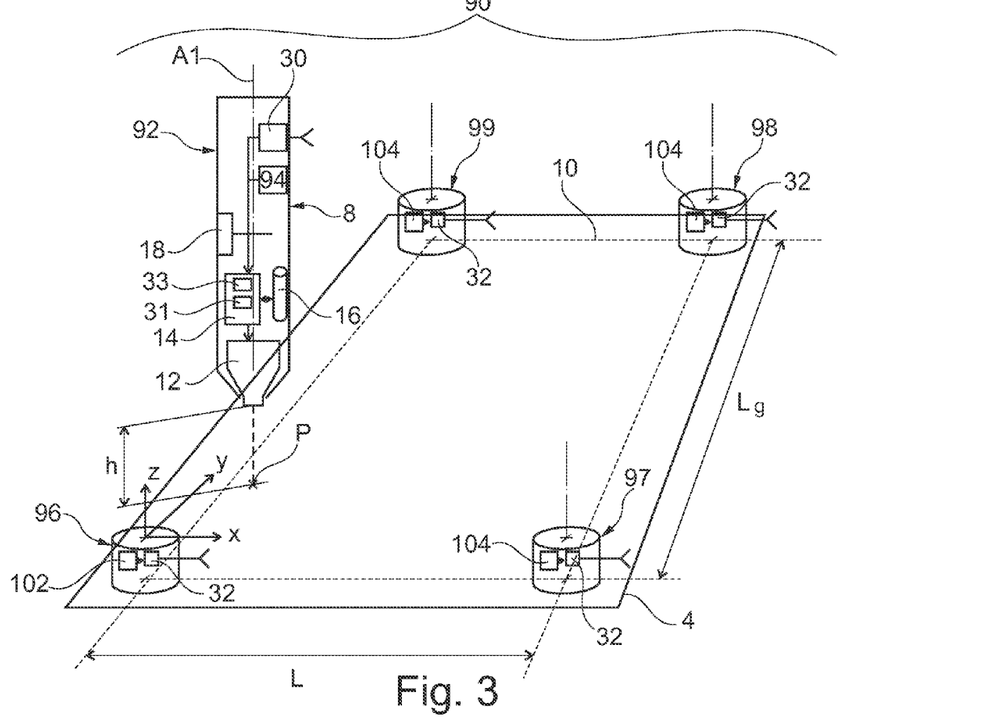
FIG. 3 is a schematic perspective illustration of a second embodiment of an etching device.

FIG. 3 shows an etching device 90 that is identical to the device 2 except that it has a different unit for measuring the position and orientation of the etching head 12. More precisely, the measuring unit is this time produced using at least one triaxial magnetic source and at least one triaxial magnetic-field sensor.

The expression "triaxial magnetic-field source" denotes a magnetic-field source that can produce magnetic fields in at least three different non-collinear directions. Typically, these field directions are orthogonal to one another. For example, such a triaxial source can be produced using three coils each wound about three winding axes that lie perpendicular to one another. For example, the turns of each coil are substantially equidistributed on either side of a point O of intersection between the three winding axes. Such a triaxial magnetic-field source can be modelled in the far field as three distinct magnetic dipoles centred on the point O. Points separated from the point O by three to four times the largest dimension of the triaxial source are considered to be in the far field. The largest dimension of the triaxial source is for example equal to the largest length of the coils. The triaxial source produces a magnetic field along each of the emission axes either simultaneously or sequentially in time.

The expression "triaxial magnetic-field sensor" denotes a sensor capable of measuring the magnetic field projected onto at least three measurement axes that are not collinear with one another. Typically, these measurement axes are orthogonal to one another. Such a triaxial sensor is for example produced in a similar way to the triaxial sensor except that the coils are used to measure the protection of the magnetic field and not to produce a magnetic field.

In the embodiment in FIG. 3, the pen 8 has been replaced with a pen 92 that is identical to the pen 8. However, the accelerometer 34 and the magnetometer 36 have been replaced with a triaxial magnetic-field sensor 94. This sensor 94 is secured to the pen 92 and for example housed inside this pen.

The terminals 20 to 23 have been replaced with terminals 96 to 99 that are identical to the terminals 20 to 23 except that the accelerometers 38 and magnetometers 40 have been replaced, in terminal 96, with a triaxial magnetic-field source 102 and in the terminals 97 to 99 with a triaxial magnetic-field sensor 104.

The transmitter/receivers 30 and 32 have been kept so as to allow information exchange between the pen and the reference terminals 96 to 99. This information exchange is for example used to synchronize the source 102 and the sensors 94 to 104.

The processor 33 establishes the position and orientation of the etching head 12 in the reference frame XYZ fixed, with zero degrees of freedom, to the terminal 96 by solving a system of equations. This system of equations is obtained by modelling the magnetic interactions between the triaxial source 102 and the triaxial sensor 94. In this system of equations, the coordinates x, y and z and $\theta_x$, $\theta_y$ and $\theta_z$, of the etching head are the unknowns. More information of such systems of equations may, for example, be found in patent application EP 1 502 544. The reader may also refer to patent application FR 0 953 432.

In addition, in this embodiment, the prerecorded drawing comprises a single stratum in which each pixel is associated with a respective predefined etching time $\Delta_1$, where the subscript i identifies a pixel of the stratum.

Figure 2:
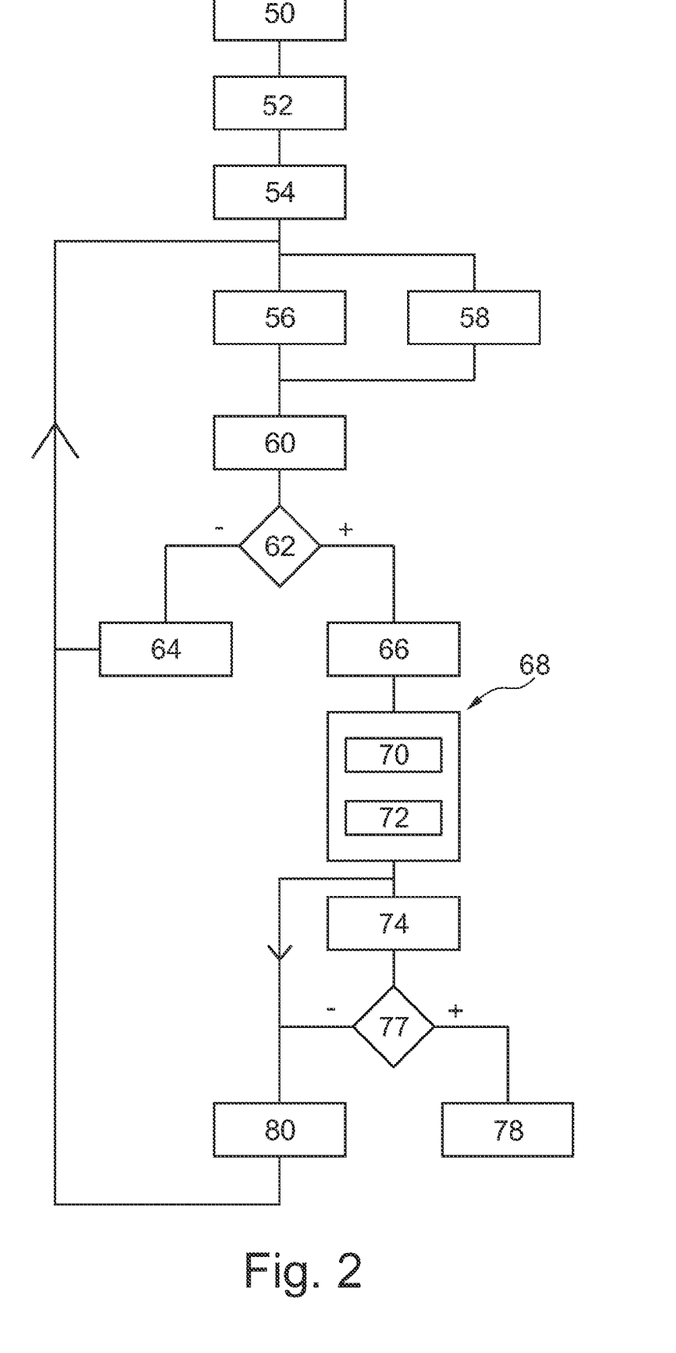
FIG. 2 is a flow chart of an etching method employing the device in FIG. 1.

The operation of the device 90 is identical to that described with regard to FIG. 2, except:
 the position and orientation of the etching head are measured differently; and
 whether a pixel is to be etched is determined differently.

More precisely, in operation 72, the unit determines that the pixel of coordinates $x_p$ and $y_p$ is to be etched if this pixel is associated, in the working copy, with a strictly positive etching time $\Delta_i$.

Next, in step 74, the etching of the point P continues as long as the pen is not moved and as long as the period of time counted by the clock 31 is below the period of time $\Delta_i$. Conversely, the etching of the point P is stopped:
 a) automatically as soon as the time counted by the clock 31 reaches the period of time $\Delta_i$; or
 b) if the operator moves the pen 92 over another point P.

In the two cases where the etching is stopped, the unit 14 calculates the difference between the period of time $\Delta_i$ and the time counted by the clock 31. Next, at the end of step 74, the unit records this difference as a new period of time A associated with the pixel of coordinates $x_p$ and $y_p$ in the working copy of the drawing of the pattern. The period of time $\Delta_i$ stored in the working copy therefore depends on the cumulative etching time of the point P. Thus, this method also allows the etch depth to be controlled at each point P.

Figure 4:
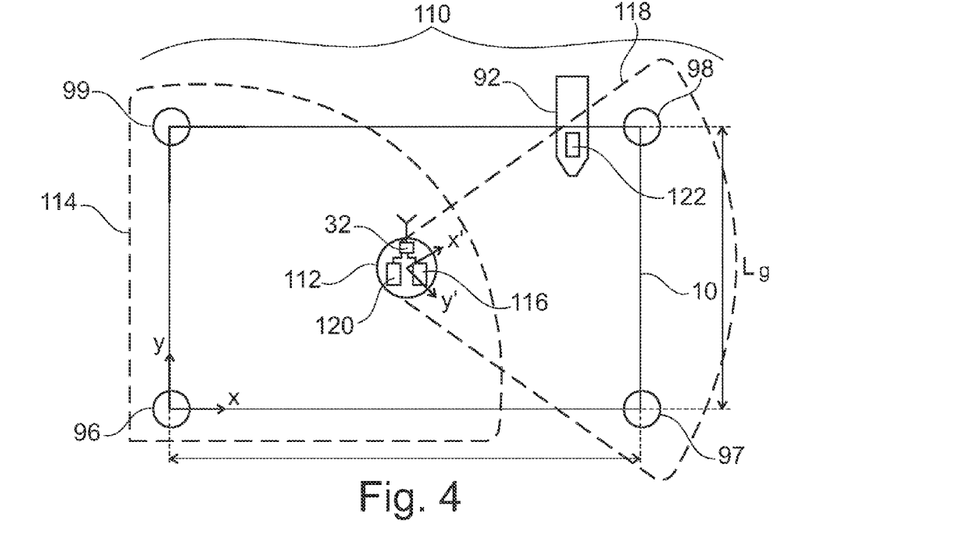
FIG. 4 is a schematic illustration of a top view of a third embodiment of a portable etching device.

FIG. 4 shows an etching device 110 that is for example identical to the device 90 except that it comprises at least one relay terminal. To simplify FIG. 4, only one relay terminal 112 has been shown.

The relay terminal 112 allows the size of the etching zone 10 to be increased without in any way increasing the power of the signals used to measure the position and orientation of the etching head. More precisely, in this embodiment, the useful range of the magnetic field emitted by the source 102 incorporated into the terminal 96 is represented by a coverage zone 114. It is assumed here that the coverage zone 114 does not extend far enough to include the terminals 97 and 98.

The terminal 112 comprises a transmitter/receiver 32 so as to exchange information with the other terminals and the pen 92. This terminal 112 also comprises a triaxial magnetic-field source 116 that is for example identical to the source 102. The useful range of this source 116 is represented by a coverage zone 118. The terminal 112 is placed inside the coverage zone 114 so that its own coverage zone 118 extends far enough to include the terminals 97 and 98. In addition, here, the pen 92 is located in the coverage zone 118 and not in the coverage zone 114.

Finally, the relay terminal 112 comprises a triaxial sensor 120, for example one identical to the sensor 104.

A coordinate converter 122 is in addition located in the pen 92.

Since the terminals 97 and 98 and the pen 92 lie only in the coverage zone 118, the position and orientation of these terminals 97 and 98 and of the pen 92 are expressed in a reference frame X'Y'Z' fixed, with no degree of freedom, to the terminal 112 (only the X' and Y' directions are shown in FIG. 4). However, since the terminal 112 comprises the sensor 120, the position and orientation of this terminal 112 relative to the terminal 96 are measured. Using these measurements, the converter 122 converts the x', y', z' coordinates of the pen 92 expressed in the reference frame X'Y'Z' into x, y, z coordinates expressed in the reference frame XYZ, the position and orientation of the relay terminal 112 being known in this reference frame XYZ. From this moment on, the operation of the device 10 is identical to that of the device 90.

Figure 5:
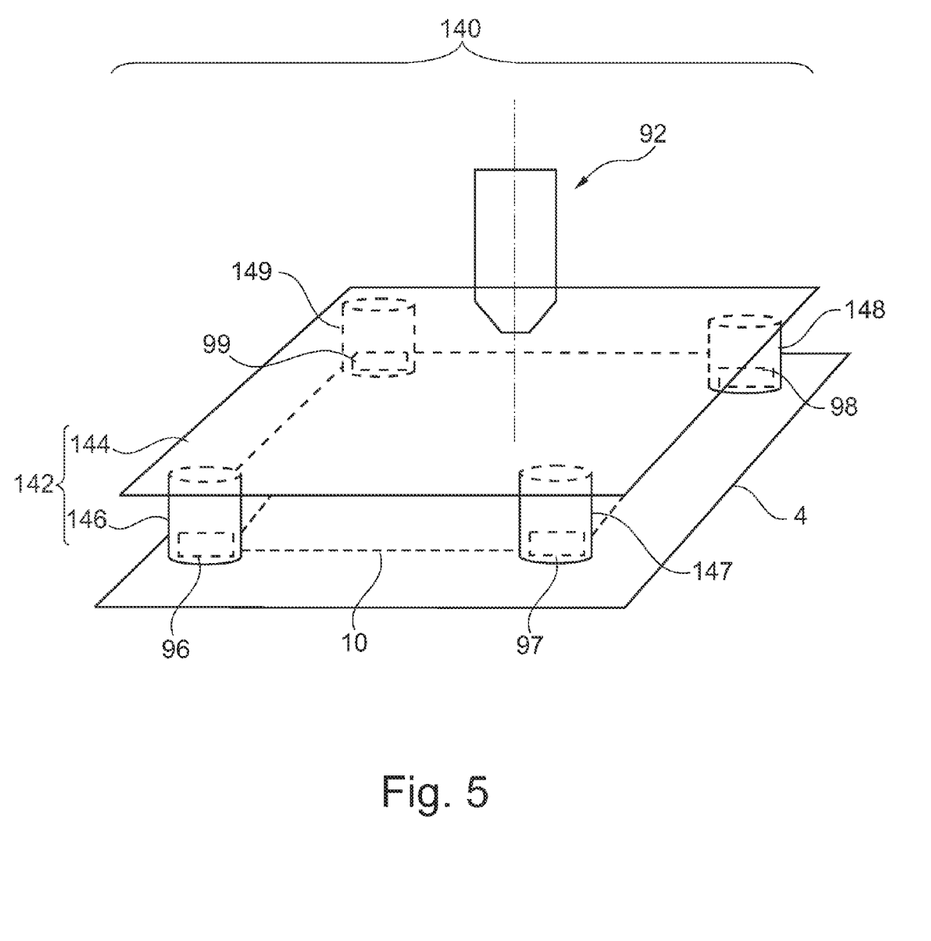
FIG. 5 is a schematic perspective illustration of a fourth embodiment of an etching device.

FIG. 5 shows an etching device 140 that is identical to the device 90 except that in addition it comprises a table 142 for protecting against sprayed shards. The table 140 comprises, for this purpose, a window 144 that is transparent to the laser beam emitted by the pen 92. For example, the window 144 is made of zinc selenide (ZnSe).

The window 144 here covers the entire etching zone 10. It is for example rectangular. The window 144 is interposed between the pen 92 and the substrate 4. Thus, if etching of the point P leads to a shard being sprayed, this shard is stopped by the window 144 before it can reach the hand of the operator.

The table 140 comprises several feet for holding the window 144 above the substrate 4. Here, the table 140 comprises four feet 146 to 149 each placed in a respective corner of the window 144. These feet rest directly on the substrate 4.

The reference terminals 96 to 99 are fixed, with no degree of freedom, to the feet 146 to 149, respectively. For example, the terminals are housed inside the feet 146 to 149. Thus, the four reference terminals 96 to 99 and the window 144 are placed by the operator in a single operation.

Preferably, the reference terminals are located at the free end of the feet 146 to 149 to directly rest, as in the embodiment in FIG. 3, on the substrate 4. However, if this is not the case, then they are placed at a known height $h_b$ above the substrate. This height $h_b$ is taken into account when the coordinates of the etching point P are determined. Except for this difference, the device 140 operates identically to the device 90.

Many other embodiments are possible. In particular, other types of etching other than laser etching are possible. For example, the etching head 12 may be replaced by another etching head able to etch by spraying particles of an abrasive material. The expression "particles of an abrasive material" is understood to mean a particle intended to be sprayed against the substrate 4, and made of a material able to abrasively tear material from said substrate. The particles of abrasive material may be corundum sand with a particle size below 100 µm, ceramic balls with a diameter smaller than 250 µm, crushed glass, metal filings, etc. In the case where the etching is carried out by spraying projectiles the unit preferably compares the measured height h to a maximum threshold $S_3$ above which the etching is halted. If this threshold $S_3$ is passed, the etching is automatically prevented.

The etching device is not necessarily portable. For example, the source of laser radiation may be located outside of the pen. In this case, the pen is connected to the source by an optical fibre. The latter embodiment especially allows more powerful radiation sources to be used. For example, the power of the beam is above 10 or 50 W.

To etch very fragile materials, a less powerful radiation source may also be used. For example, the power of the beam is 0.2 W or more.

Measuring units other than units employing reference terminals may be used. For example, the pen may be localized by measuring its acceleration from a known starting point on the substrate.

The substrate may be of any shape or size, it may be inclined at any angle to the vertical and it may be made of materials of any nature. For example, the substrate may be made of paper, it may be a pane of glass, a wall, a ceiling, a coating, etc. Only the etching head is possibly changed to suit the nature of the material of the substrate.

When the substrate is inclined to the vertical, the reference terminals are preferably equipped with means for fastening them to the substrate 4. For example, the planar face of these terminals, intended to be brought into contact with the substrate, is covered with an adhesive allowing these terminals to be manually bonded to and then debonded from the substrate.

If the etching zone is larger than the range of the signals required to measure the position and orientation of the etching head, rather than using relay terminals, the reference terminals may be replaced by reference terminals that can emit signals with increased power and range.

The number of reference terminals may be larger than four. For example, using more than four reference terminals allows etching zones having more than four corners to be simply defined, such as for example a pentagon-shaped etching zone.

The number of reference terminals may also be below four. For example, in a simplified case, only one reference terminal is necessary. For example, for the embodiment shown in FIG. 3, the terminals 97 to 99 of the device 90 are removed. However, in the latter case, the stretch coefficients are no longer a function of the distance between two reference terminals. The size of the etching zone is therefore constant or systematically taken to be equal to the size of the pattern or only deduced using the size of the pattern.

As a variant, the predefined relationship that relates a reference terminal to a pixel of the drawing of the pattern is prerecorded only for one or more first reference terminals and not for one or more second reference terminals. For example, there is only one first reference terminal. Next, the predefined relationship is calculated for the second reference terminals. For example, the predefined relationship is established for the second reference terminals depending on their measured position relative to the first reference terminal and the predefined relationship that relates this first reference terminal to a pixel of the drawing of the pattern.

The reference terminals do not necessarily correspond to a corner of the pattern. For example, as a variant, each reference terminal is associated with a predefined point of the pattern other than a corner of this pattern. In particular, a reference terminal may be associated with the centre of the pattern whereas another reference terminal is associated with a midpoint of the upper edge of the pattern.

The reference terminals may be placed on one side of the substrate while the pen is located on the other side.

The distribution of the various elements described with regard to the figures above between, on the one hand, the pen, and on the other hand, the terminals, may be modified. For example, as a variant, the control unit and the memory are housed in a terminal. Generally speaking, all the functions described here as being performed by elements of the pen can be distributed differently between the pen and the terminals. The memory in which the drawing of the pattern to be etched is stored is also not necessarily located in the pen or one of the terminals. It may, for example, be located in a computer that can communicate with the pen 8 via the interface 18. In this case, the pen may demand information on the drawing of the pattern to be etched only as and when it has need of said information.

It is also possible for the magnetic source to be located in the pen and not in the terminal or for several magnetic sources to be used simultaneously, at least one of these sources being located in a terminal and at least one being located in the pen. As a variant, the source 116 and the sensor 120 are produced using one and the same triaxial assembly of three coils, the winding axes of which are not collinear. In this case, the triaxial assembly is switched either to a source mode or a sensor mode. When the coils of the triaxial assembly are switched to the source mode they are powered so as to generate the magnetic fields. In the source mode, the triaxial assembly is identical to one of the triaxial sources described above. In the sensor mode, the coils are not powered. Consequently, the ambient magnetic flux that passes through them induces currents that allow the ambient magnetic field to be measured. In the sensor mode, the triaxial assembly is identical to one of the triaxial sensors described above.

Other types of wave other than ultra-wide band waves may be used. For example acoustic waves may be used.

The stretch factor may be determined only using the distance, for example, separating two reference terminals from each other. Typically, in this case, these terminals are used to define the diagonal through the pattern to be etched and they will preferably be located at the ends of this diagonal.

In another variant, the calculation of the stretch factor is omitted. In this case, the size of the etching zone is constant or else only established using the size of the drawing of the pattern stored in the memory 16.

The orientation of the pen may also be represented by a quaternion. If each source continuously generates a periodic magnetic field with a frequency signature that is specific to it, then synchronizing the source 102 and the sensors 94 and 104 using the transmitter/receivers 30, 32 is not necessary. Instead, synchronous detection may be used.

The etching method may also be modified. For example, it may not be automatically stopped. In this case, the etching of the substrate 4 is stopped by the operator and not automatically.

The various embodiments of the operation 72 and the step 74 described here may be combined with any embodiment of the etching device.

Step 77 may be modified so as to allow a given point in the etching zone to be etched on each successive passage of the pen over this point. For example, in step 77, the information associated with the etched pixel is not modified.

Step 62 may be modified so that other criteria are used to decide whether the etching is automatically stopped. For example, in a simplified variant, the comparison with the threshold $S_1$ or $S_2$ is omitted.

As another variant, when the height h passes below the threshold $S_1$ an alarm, for example an audible signal, is automatically triggered so as to signal to the operator that the pen 8 is too close to the substrate 4.

In step 68, the etching head may be controlled as a function of the orientation of the axis A1 and/or the distance h between the head 12 and the substrate. Conversely, control of the etching head as a function of the measured orientation or distance h may be omitted.

The table 140 may be incorporated in all the other embodiments of the etching device. For example, if it is incorporated in the device 2, then the terminals 20 to 23 replace the terminals 96 to 99.

The table 140 may comprise a number of feet other than four. However, preferably, it comprises at least three feet. The end of each foot may be equipped with a mechanism for fastening to the substrate 4, such as suckers. This allows the table 140 to be placed on substrates that are inclined or vertical.

In another variant, the device 2 comprises several pens used simultaneously to etch the same pattern in the same etching zone. This allows several operators to work etching the same pattern at the same time in the same etching zone. In order that the various parts of the same pattern etched by each of the pens juxtapose perfectly, all that is required is for the position of each of these pens to be measured in the same reference frame linked to the reference terminals.

The features of the dependent claims may be implemented independently of the features that allow the etching of the pattern to be stopped automatically. In particular, a relay terminal may be employed without implementing the features that stop the etching of the pattern at a particular point P.

The invention claimed is:

1. An apparatus for etching a pattern in an etching zone laid out on a substrate, said apparatus comprising a pen that can be freely moved manually relative to said etching zone, said pen being equipped with an etching head able to etch said substrate at an etching point when etching is triggered, a measuring unit for measuring position and orientation of said etching head relative to said substrate, a control unit configured to calculate coordinates of said etching point as a function of said measured position and orientation of said etching head relative to said substrate, to trigger etching at said etching point if said calculated coordinates of said etching point correspond to coordinates of a point to be etched, said coordinates of said point to be etched being encoded in a prerecorded drawing of said pattern, and to automatically prevent etching otherwise, and a first removable reference terminal that can be manually positioned on said substrate, said removable reference terminal being associated with a corresponding point of said pattern by a predetermined relationship that is independent of a position of said reference terminal on said substrate, wherein said measuring unit is configured to measure position and orientation of said etching head relative to said removable reference terminal, and wherein said control unit is configured to establish correspondence or lack of correspondence between said calculated coordinates of said etching point and coordinates of a point to be etched as a function of said predefined relationship that associates a point of said pattern with said removable reference terminal.

2. The apparatus of claim 1, further comprising a second removable reference terminal, wherein said measuring unit is configured to measure a distance between said first and second reference terminals, and wherein said control unit is configured to establish one of correspondence and lack of correspondence between calculated coordinates of said etching point and coordinates of said point to be etched as a function of said distance between said first and second reference terminals so as to at least one of stretch and shrink said pattern by an extent proportional to said distance between said first and second reference terminals.

3. The apparatus of claim 1, further comprising a relay terminal that can be manually positioned independently of said first reference terminal, said relay terminal being free of association with a point of said pattern by a pre-defined relationship that is independent of a position of said point relative to said substrate, wherein said measuring unit further comprises a sensor for sensing position and orientation of said etching head in a reference frame of said relay terminal, a sensor for sensing position and orientation of said relay terminal relative to said reference terminal, and a converter for converting a position and orientation of said etching head measured in said reference frame of said relay terminal into a position and orientation relative to said reference terminal.

4. The apparatus of claim 1, wherein said etching head is configured to emit a laser beam that etches said etching point.

5. The apparatus of claim 1, further comprising a table having a window to provide protection against sprayed etching shards, and feet for resting on said substrate, and wherein said reference terminal is fixed with no degree of freedom to said table.

6. The apparatus of claim 1, wherein said etching head is configured to spray particles made of abrasive material for etching said etching point.

7. A method for etching a pattern in an etching zone laid out on a substrate material, said method comprising manually moving a pen freely over said etching zone, said pen being equipped with an etching head able to etch said substrate at an etching point when etching is triggered, manually positioning a first removable reference terminal on said substrate, said removable reference terminal being associated with a corresponding point of said pattern by a predetermined relationship that is independent of a position of said reference terminal on said substrate measuring a position and orientation of said etching head relative to said reference terminal, calculating coordinates of said etching point as a function of measured position and orientation of said etching head, and triggering etching at said etching point if coordinates calculated for said etching point correspond to coordinates of a point to be etched that are encoded in a prerecorded drawing of said pattern and automatically preventing said etching otherwise.

8. The method of claim 7, further comprising storing, in a memory, each point of said pattern that has already been etched in response to etching having been triggered for said point, preventing etching of any point that has already been etched, and after etching of a point has been triggered, automatically stopping said etching following lapse of a preset period of time.

9. The method of claim 8, wherein storing, in a memory, each point of said pattern that has already been etched in response to etching having been triggered for said point, preventing etching of any point that has already been etched, and after etching of a point has been triggered, automatically stopping said etching following lapse of a preset period of time are reiterated for each stratum of said prerecorded drawing, said prerecorded drawing comprising at least two strata, each of which is encoded with coordinates of points to be etched in a respective stratum of said substrate.

10. The method of claim 7, further comprising counting cumulative time spent etching a given etching point, and preventing any additional etching of said etching point if said counted etching time is above a predefined threshold and permitting additional etching of said point otherwise.

11. The method of claim 7, further comprising determining a distance that separates said pen from said substrate using said measured position and orientation of said etching head, and, if this distance is below a predefined threshold, at least one of preventing etching of said pattern in said substrate and triggering an alarm.

12. An apparatus comprising a pen for use in a device for etching a pattern in an etching zone laid out on a substrate, said pen comprising an etching head for moving manually over said etching zone, a component for measuring position and orientation of said etching head relative to a removable reference terminal on said substrate, wherein said removable reference terminal is associated with a corresponding point of said pattern by a predetermined relationship that is independent of a position of said reference terminal on said substrate, and a control unit configured to calculate coordinates of said etching point as a function of measured position and orientation of said etching head relative to said removable reference terminal, to trigger etching at said etching point if calculated coordinates of said etching point correspond to coordinates of a point to be etched, said coordinates of said point to be etched being encoded in a prerecorded drawing of said pattern, and to automatically prevent etching otherwise.

13. The apparatus of claim 1, wherein said pen has a weight that is less than one kilogram.

14. The apparatus of claim 1, wherein said pen has a weight that is less than 200 grams.

15. The apparatus of claim 1, wherein said controller is further configured to compare said calculated coordinates of said etching point to coordinates of a point to be etched, said coordinates of said point to be etched being encoded in said prerecorded drawing of said pattern.

16. The apparatus of claim 12, wherein said controller is further configured to compare said calculated coordinates of said etching point to coordinates of a point to be etched, said coordinates of said point to be etched being encoded in said prerecorded drawing of said pattern.

* * * * *